United States Patent [19]

Ferrante et al.

[11] Patent Number: 5,847,876
[45] Date of Patent: Dec. 8, 1998

[54] FINGERPRINT RESISTANT ANTI-REFLECTION COATINGS

[75] Inventors: Ronald A. Ferrante, St. Charles, Mo.; Rudolf H. Ott, Batchtown, Ill.

[73] Assignee: McDonnell Douglas, St. Louis, Mo.

[21] Appl. No.: 669,976

[22] Filed: Jun. 25, 1996

[51] Int. Cl.⁶ .............................. G02B 1/10; G02C 7/10
[52] U.S. Cl. ..................... 359/581; 359/586; 359/589; 359/580; 351/44
[58] Field of Search ...................... 359/580, 581, 359/586, 589, 601, 602; 430/156, 157; 351/44

[56] References Cited

U.S. PATENT DOCUMENTS

| | | | |
|---|---|---|---|
| 4,070,097 | 1/1978 | Gelber | 359/581 |
| 4,260,222 | 4/1981 | Kozawa | 359/586 |
| 4,846,551 | 7/1989 | Rancourt et al. | 359/589 |

*Primary Examiner*—Jon W. Henry
*Assistant Examiner*—Audrey Chang
*Attorney, Agent, or Firm*—Veo Peoples, Jr.

[57] ABSTRACT

Two-layer, thin film coating designs on glass substrates are described which reduce coated surface reflectance while inhibiting the visibility of fingerprints.

8 Claims, 4 Drawing Sheets

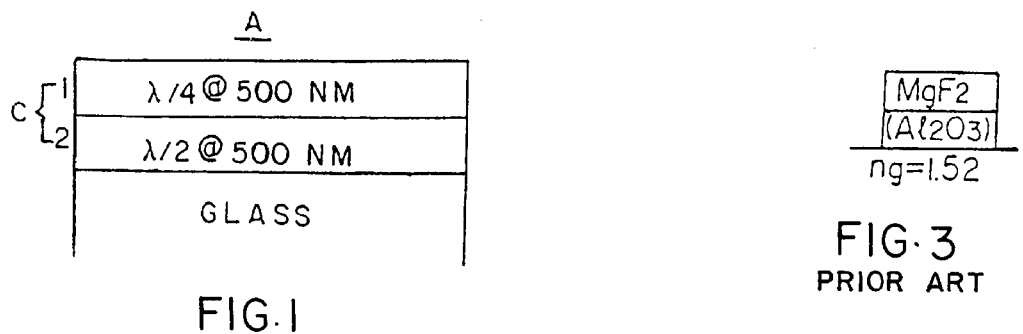
FIG. 1
FIG. 3
PRIOR ART
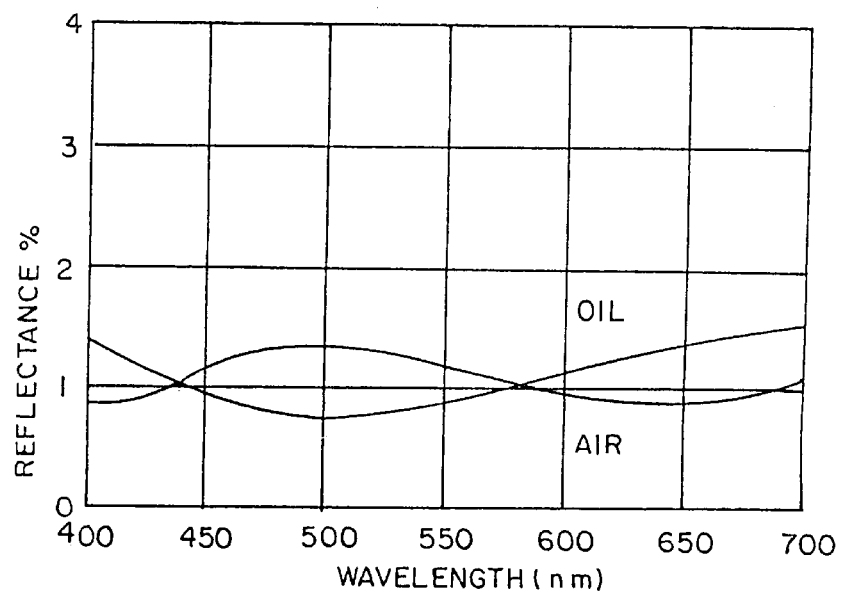
FIG. 2
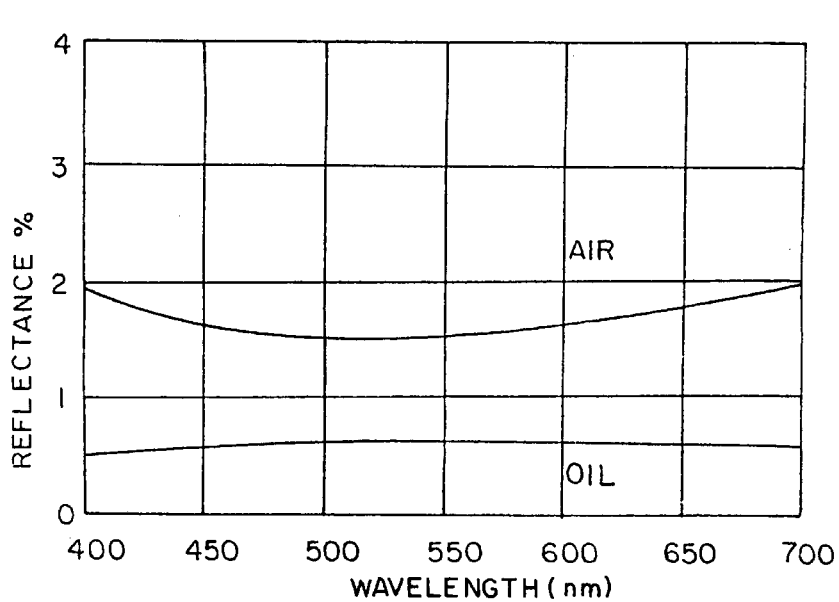
FIG. 2A
PRIOR ART

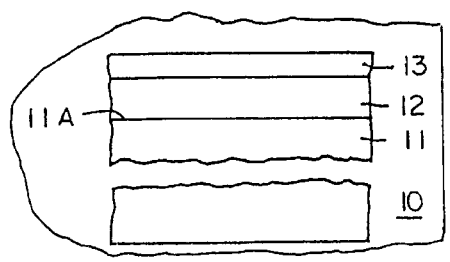
FIG. 8 PRIOR ART
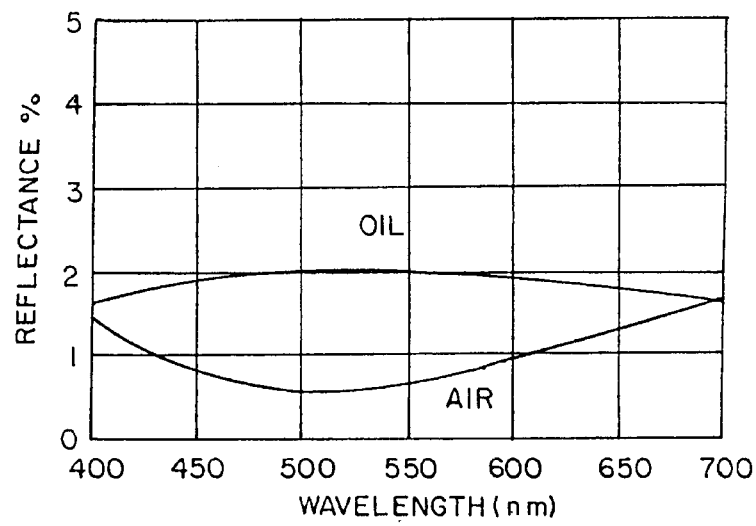
FIG. 9 PRIOR ART
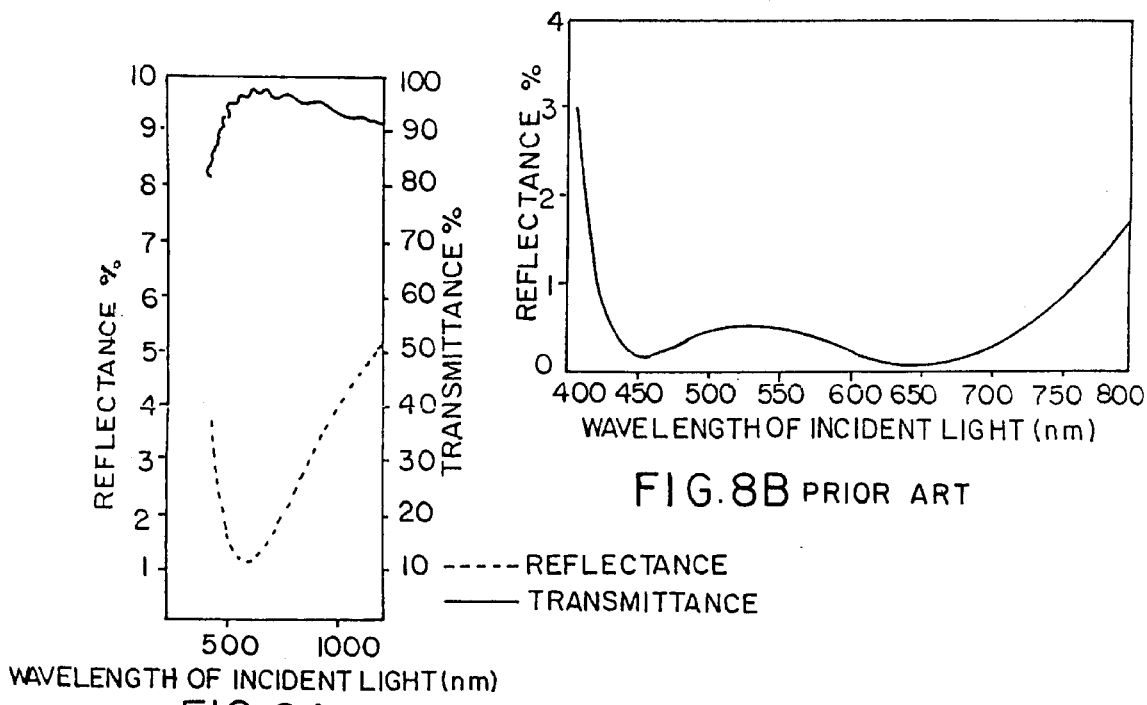
FIG. 8B PRIOR ART
FIG. 8A PRIOR ART

FINGERPRINT RESISTANT ANTI-REFLECTION COATINGS

FIELD OF THE INVENTION

This invention relates generally to anti-reflection coatings for screens, panels, filters, etc., which are generally susceptible to frequent user handling. It relates particularly to two-layer anti-reflection coatings which produce relatively high displayed image contrast.

BACKGROUND OF THE PRIOR ART

T.V. screens, CRT screens, contrast enhancement filters, vehicular windshields and instrument or touch-screen panels (particularly for aircraft) are routinely coated with relatively inexpensive thin films to reduce glare, shadows, "ghost images", etc., caused by visible light reflecting from the surface of the glass substrates. These thin film "anti-reflection coatings", while reducing reflectance, simultaneously serve to enhance the visible contrast of the desired images projected through the substrate.

Often these anti-reflection coatings consist of a single layer of magnesium fluoride, one-quarter wavelength in optical thickness. Up until 1965, this was the primary anti-reflection coating used. Some two-layer coatings were used but it was found that they were very selective. All of such two-layer coatings had a similar limitation in that the range of substantially zero reflectance was very small and went up very steeply on opposite sides of the visible spectrum. One such two-layer coating provided the well-known V-shaped reflectance curve, whereas other two-layer coatings provided a W-shaped reflectance curve. Thus, although it was possible to obtain a narrow range of better reflectance with certain two-layer coatings, it was impossible to obtain a substantial increase in overall efficiency of such coatings in comparison to a conventional one-layer coating such as magnesium fluoride ($MgF_2$). In 1965 Alfred J. Thelen disclosed a substantially efficient three-layer coating in U.S. Pat. No. 3,185,020. However, due to the expense of coating three or more layers, the one layer $MgF_2$ coating has remained the predominant anti-reflection coating for most normal uses, while the two-layer coatings have been largely abandoned altogether.

Unfortunately, the enhanced contrast, which stems generally from single and multi-layer anti-reflection coatings also enhances the visibility of foreign marks or substances which may inadvertently occur on the coated substrates, particularly oil from fingerprints. For most purposes, fingerprints can be removed when routinely cleaning or dusting the surface of screens and panels. However, for some purposes, such as instrument touch panels, particularly for aircraft, where a pilot's life is at stake, it is essential to minimize the reduction in contrast of the displayed information due to fingerprints and other oil based foreign materials. In such instances, the instrument panels are continually being wiped of fingerprints so frequently that the life span of the panels and screens are substantially shortened.

Generally, as discussed above, the predominant anti-reflection coatings for most common uses are single layer quarter wave $MgF_2$, while two-layer coatings have been practically abandoned. $MgF_2$ is most common as the single-layer for several reasons; e.g., it is a low cost, durable and relatively good low index material for anti-reflection single layer coatings on glass. Quarter wave thicknesses are employed because this thickness is well known to minimize reflectance of coated surfaces.

Examples of prior art anti-reflection coatings, which serve to enhance rather than inhibit fingerprint images, are as follows:

1. U.S. Pat. No. 3,604,784 discloses anti-reflection (AR) coatings having three or more layers. The coatings generally have sufficient anti-reflection effect only on expensive glass compositions having refractive indices of 1.68 to 1.88. The first layer, adjacent to air, is a quarter wave thick $MgF_2$ (N=1.38) at a design wavelength approximately in the center of the visual spectrum. The second layer is a mixture of oxides of titanium and $Al_2O_3$ (N=2.00) having a half wave thickness. The third layer, adjacent to the glass, is $Al_2O_3$ or MgO (N=1.60–1.72) with an optical thickness of a half wavelength.

2. U.S. Pat. No. 3,781,090 discloses a variety of four layer AR coatings effective for all conventional glass substrates. The layers, in sequence from the air side to the glass substrate side, are constructed as follows: first layer having low index of refraction (N=1.35 to 1.62); the second a high index (N=2.00 to 2.30): the third a medium index (N=1.56–1.72); the final fourth layer a low index (N=1.35–1.62).

3. U.S. Pat. No. 3,738,732 discloses a quasi-symmetrical three-layer coating of a desired equivalent refractive index N having a wide dispersion effect in regions adjacent to the visible region. The layers, in sequence from air to the glass substrate, are, for example, the first layer being quarter wave thick $MgF_2$, the second layer being half wave thick $TiO_2$, and the third being half wave thick $Al_2O_3$. The patent shows, in the vector method, the reflectivity at the wavelength 400 microns of a double-layer ($MgF_2/Al_2O_3$) over glass (N=1.52). The spectral transmittance will not satisfy the condition of reflectivity less than 0.3 percent to wavelengths of 4000 Å, 6000 Å, and 7000 Å (central wavelength is presumed to be 5000 Å). Such prior art coatings composed of $MgF_2/Al_2O_3$ would have, in fact, enhanced fingerprint images as can be seen from FIGS. 4(a) and 4(b) herein because reflectance in oil differs from reflectance in air. In the case of glass having a high refractive index, the double-layer coating having a half wave thick $Al_2O_3$ under a quarter wave thick $MgF_2$, attains the equivalent effect as that of the $MgF_2$ single-layer coating relative to a central wavelength, so that the reflectivity at light wavelengths other than the central wavelength may be reduced; but it was not satisfactory in view of the spectral characteristics in the visible region. FIG. 2 of the patent shows its W-shaped reflectivity curve. This is the same problem identified in U.S. Pat. No. 3,185,020.

4. U.S. Pat. No. 4,196,246 discloses anti-reflection coatings for synthetic resin substrates having a first layer $SiO_2$ deposited on the resin base, a second layer $Al_2O_3$ deposited on the first layer and a third layer $SiO_2$ or $MgF_2$ deposited on the second layer. The first is 1 to 5 microns thick while the second is a quarter wave and the third is a quarter wave optical thickness.

5. U.S. Pat. No. 4,264,133 discloses a two or three layer coating requiring replacement of a half wave thick layer with a composite layer characterized by a higher equivalent inhomogeneity than the inhomogeneity of the half wave layer.

6. U.S. Pat. No. 4,333,983 discloses a three-layer coating having a flexible polymer first layer such as polyethylene terephthalate, commonly sold under the trademark Mylar, coated with an $Al_2O_3$ having an optical thickness of at least 170 nanometers (half wave) at a design wavelength of 560 nanometers, with a final layer over the $Al_2O_3$ of, for example, MgF$_2$ to a thickness of quarter wave at a design wave length of 560 nanometers.

7. U.S. Pat. No. 4,387,960 discloses a multilayer anti-reflection coating having four layers defined by various refractive indices and physical thicknesses and a pre-selected design wavelength. The thicknesses vary from one-quarter to three-quarter optical wave thickness and the indices of refraction vary from 1.35 to 2.30.

8. U.S. Pat. No. 4,436,363 discloses a broadband anti-reflection multilayer coating for infrared transmissive materials, which includes a first layer of zinc-selenite or zinc-sulfide.

9. U.S. Pat. No. 4,798,994 discloses an anti-reflection coating which comprises at least a three-layer interference filter having high refractive index materials, such as niobium oxide, and low-refractive index materials, such as silicon dioxide.

10. U.S. Pat. No. 4,804,883 discloses a special anti-refraction coating for cathode-ray tubes. The coating discloses a quarter wave thick Al$_2$O$_3$ (alumina) layer deposited on the glass substrate, a second layer being one-half optical thickness of TaO$_5$ (tantalum oxide) with index of refraction of 2.1, and a third layer coated thereover of one quarter wave thickness MgF$_2$ (magnesium fluoride) having an index of refraction of 1.38.

11. U.S. Pat. No. 5,051,652 discloses a panel with an anti-reflection multilayer film thereon which comprises a glass substrate, coated with an electricity collector for leading static electricity, a magnesium fluoride layer, a layer of zirconium oxide mixed with titanium dioxide, and a final top coating of magnesium fluoride.

12. U.S. Pat. No. 5,243,255 discloses a cathode-ray tube having a light transmittance of at least fifty percent and a reflectivity reduction film formed on the external surface of the tube's face plate. The reflectivity reduction film is a low refraction index layer formed by using a coating liquid obtained by a dispensing and mixing magnesium fluoride superfine particles to a base coating of an alcohol solution containing a silicon alkoxide.

Other anti-reflection coatings for cathode-ray tubes are disclosed in U.S. Pat. Nos. 5,281,893 and 5,446,339.

SUMMARY OF THE INVENTION

It is therefore a principal object of the present invention to provide a method for making glass substrates fingerprint resistant.

It is also an object of the present invention to provide a novel anti-reflection coating greatly reducing reflectance over a wide band of wavelengths, yet by employing a two layer, anti-reflection coating which surprisingly inhibits images of fingerprints from forming when touched by human hands.

These objects and other objects which will become apparent from the following description of the drawings and detailed description and claims are fulfilled by coating glass substrates with an anti-reflection layer which has equal reflectance in air and in oil.

BRIEF DESCRIPTION OF THE DRAWINGS

FIG. 1 is a schematic cross-sectional view of an anti-reflection coating of the present invention;

FIG. 2 is a reflectance graph for the embodiment of the present invention illustrated at FIG. 1, comparing reflectance in air and in oil;

FIG. 2a is a reflectance graph for conventional single-layer MgF$_2$ in air and in oil;

FIG. 3 is a schematic cross-sectional view of a prior art two-layer anti-reflection coating disclosed in U.S. Pat. No. 3,738,732;

FIG. 8 is a schematic cross-sectional drawing of the anti-reflection coating from U.S. Pat. No. 4,333,983 (FIG. 1 of the patent, having an MgF$_2$ outer layer and an Al$_2$O$_3$ inner layer coated over Mylar);

FIGS. 8a and 8b are reflectance/transmission diagrams (in air) from FIGS. 7 and 9 in U.S. Pat. No. 4,333,983;

FIG. 9 is a reflectance diagram of the FIG. 8 coating showing reflectance in oil and in air;

DETAILED DESCRIPTION AND PREFERRED EMBODIMENTS

Figure 4A:
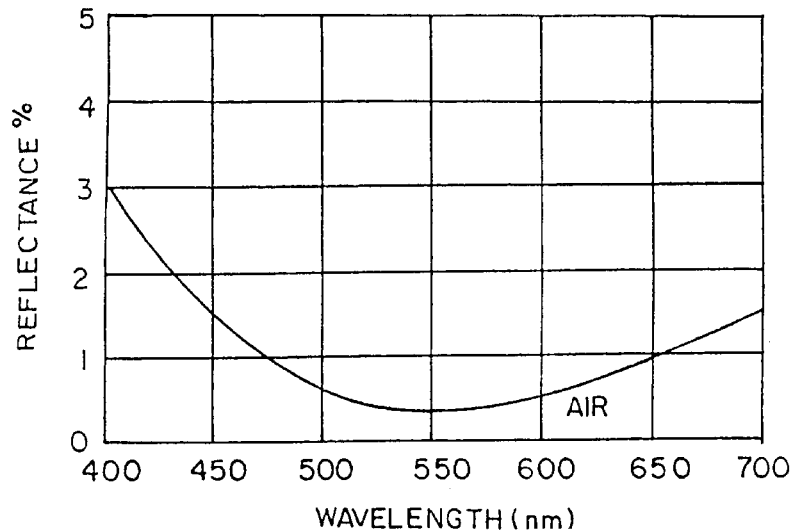
FIGS. 4(a) and 4(b) are reflectance graphs for the coating of FIG. 3, comparing reflectance in air 4(a) and in oil 4(b).

The discovery that equal and effective reflectance in oil and in air could be possible over a broad spectrum by employing a two-layer anti-reflection coating, resulting in the inhibition of fingerprint images on glass substrates, is unexpected. Based upon prior state of the art teachings, the most predictable result would be substantially different reflectances in air and in oil, for an arbitrarily designed anti-reflection coating.

Anti-reflection coatings are customarily designed to operate at a very specific substrate refractive index, incident light wavelength and external index. A coating designed for one set of operating conditions is not expected to be useful at all under substantially different conditions. Anti-reflectance in air (index=1.0) and in oil (index=1.5–1.6) is such a large index shift that, in general, coatings designed for use in air perform poorly in oil and vice versa. Fingerprint resistance is herein surprisingly achieved by a narrow range of specific design indices which result in performance nearly the same in air and oil (a much more stringent operating requirement). This unexpectedly simple and environmentally stable invention uses readily available coating materials.

In accordance with this invention, it has been surprisingly discovered that preferably a layer of aluminum oxide formed on a glass substrate to a thickness of no greater than one-half wavelength optical thickness at between 450 and 550 nanometers, preferably 500 nanometers, provides a fingerprint resistant optical coating when, deposited thereon, is a quarter wavelength optical thickness of preferably magnesium fluoride (with a refractive index of 1.38) at a pre-selected design wavelength of preferably 500 nanometers.

The specification and drawings, particularly in the preferred embodiment of the present invention, are provided in a manner that skilled artisans in the optical field can use the invention. The embodiments of the invention disclosed herein are the best modes contemplated by the inventor for carrying out his invention in a commercial environment, although it should be understood that various modifications can be accomplished within the parameters of the present invention.

Referring to FIG. 1, a schematic cross-sectional view of the structure of the anti-reflection coating of the present invention is disclosed. The anti-reflection coating C is applied to the surface of a glass substrate with the outermost layer being adjacent to the air medium A. The anti-reflection coating C comprises a two-layer structure consisting of a first layer 1 and a second layer 2 in sequence from the air side to the glass substrate side. The first layer 1 is made of a material having a low index of refraction in the range of 1.35 to 1.46, such as $MgF_2$, or $SiO_2$ and is approximately one-quarter wavelength in optical thickness with respect to a design wavelength of from 450 nanometers to 550 nanometers, preferably 500 nanometers. A second layer 2 is composed of a material with a medium index of refraction ranging from 1.60 to 1.72, such as $Al_2O_3$, or MgO at a thickness in the range of about one-half wavelength to about three/quarters wavelength in optical thickness (preferably one-half) with respect to the 500 nanometer design wavelength previously stated.

FIG. 2(a) shows that the average difference between the air and oil reflectances of conventional single layer $MgF_2$ ARs will provide high contrast images of fingerprints throughout the spectrum. However, referring to FIG. 2, in accordance with the present invention, it will be noted that the reflectance in air, noted as approximately 1.0%, and the reflectance in oil, noted as approximately 1.0%, are essentially equal throughout the visible range of the spectrum from 400 nanometers to 700 nanometers. The difference, and therefore the comparative contrast, between the reflectances in air and oil throughout the spectrum is, surprisingly, 0. This results in there being no visible fingerprint images in the visible spectrum. Therefore, the fingerprints and other oil based marks on the substrate will not appear to the human eye.

Contrary to this discovery are the structures and reflectance diagrams for various prior art structures which are closely configured to that of the present invention. These structures and reflectance appear in FIGS. 3 through 9.

Referring particularly to FIGS. 8, 8(a), 8(b) and 9, the surprising nature of the invention is illustrated by comparing it to U.S. Pat. No. 4,333,983 which deals with a central design wavelength of 560 nanometers. That design wavelength is above the 550 nanometers operative range of the invention, and therefore fails to achieve fingerprint resistance.

Figure 4B:
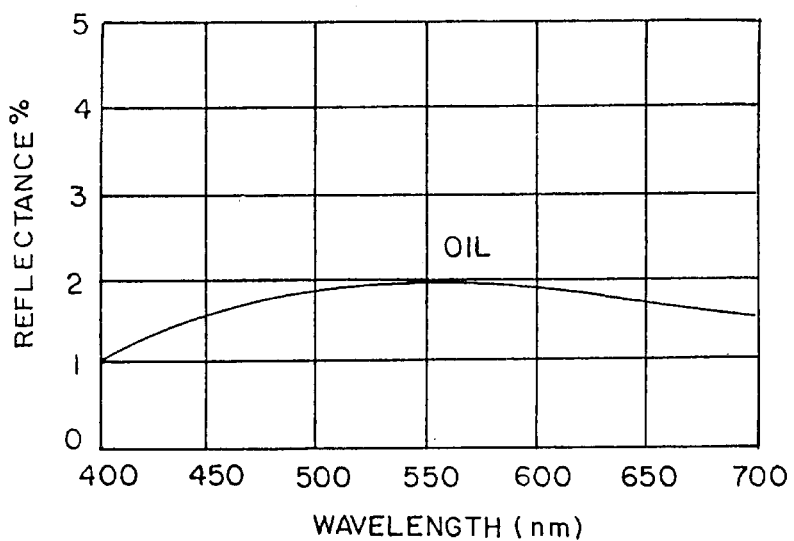
Figure 5:
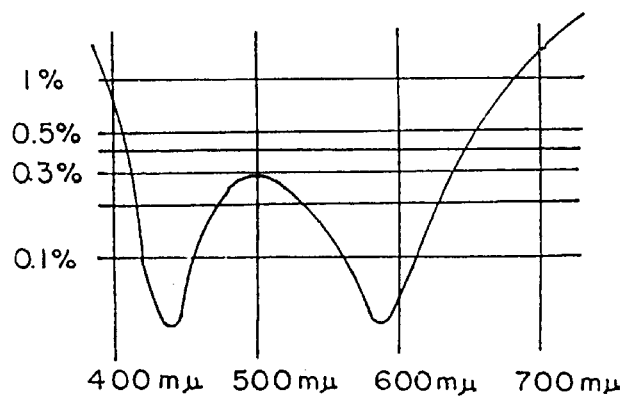
FIG. 5 is a reflectance graph illustrating the FIG. 3 anti-reflection coating in air as measured in U.S. Pat. No. 3,738,732 (FIG. 2 of the patent)
Figure 6:
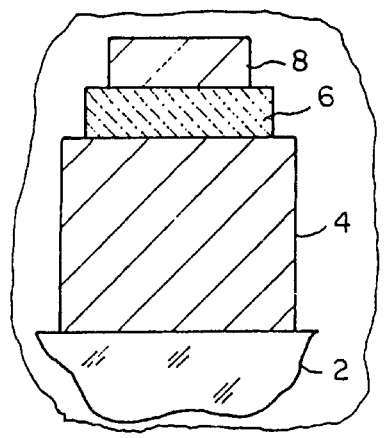
FIG. 6 is a schematic cross-sectional drawing of the anti-refective coating disclosed in FIG. 1 of U.S. Pat. No. 4,196,246.

Referring particularly to FIGS. 3, 4(a) and 4(b), the surprising nature of the invention is more dramatically demonstrated by comparing the performance of the prior art two-layer coating structure disclosed in U.S. Pat. No. 3,738,732. The large difference in reflectance in air, as compared to reflectance in oil, is readily apparent from a quarter wave thick $Al_2O_3$ lower layer, a quarter wave $MgF_2$ top layer, and a 550 nanometer design wavelength.

Figure 7A:
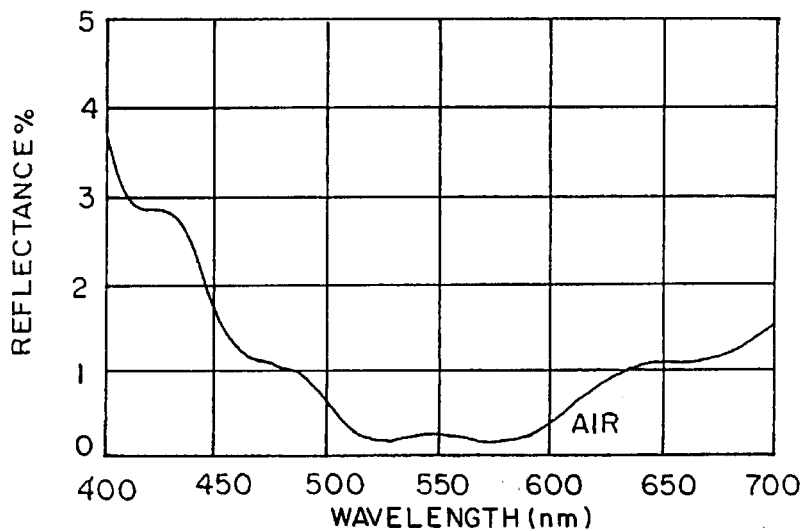
FIGS. 7(a) and 7(b) are reflectance graphs of the above FIG. 6 coating in air 7(a) and in oil 7(b).
Figure 7B:
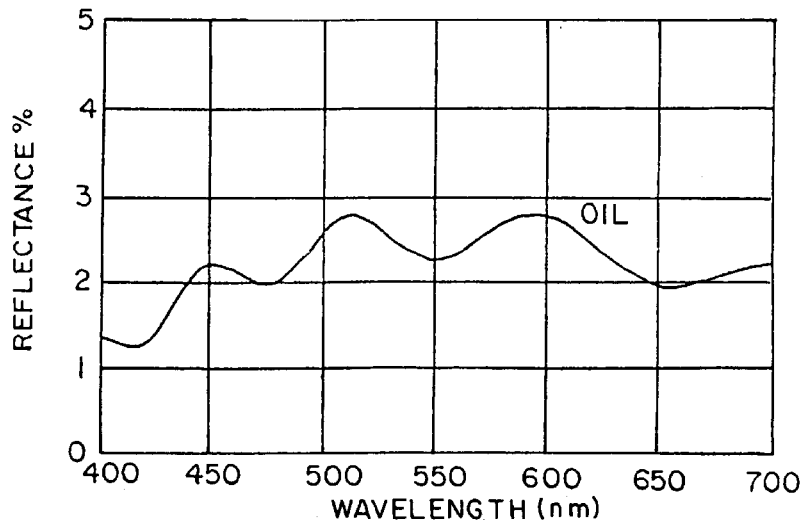

Also, FIGS. 7(a) and 7(b) note the differences between a three-layer AR coating (quarter wave $MgF_2$ top layer, quarter wave $Al_2O_3$ middle layer, and quarter wave $SiO_2$ bottom layer) as disclosed in U.S. Pat. No. 4,196,246. If one were to attempt to deduce the structures offered from the present invention by an empirical analysis, one would proceed with the formula depicted below.

$$\frac{[N_a N^2_2 - N_a N_1^2]^2}{N_a N^2_2 + N_g N^2_1} = \frac{[N_o N_2^2 - N_o N_1^2]^2}{N_o N^2_2 + N_g N^1_2}$$

where
Na=refractive index of air
$N_1$=refractive index of layer 1
$M_2$=refractive index of layer 2
$N_o$=refractive index of fingerprint oil
$N_g$=refractive index of substitute This empirical analysis would be more complicated if more layers were initially considered. The formula has too many unknowns to find a mathematical solution. Even assuming that one began with two layers, he would need a two-layer coating design modeled in air and also modeled in an oil environment. Then one would be required to adjust the layer thicknesses by trial and error and follow the results of each model. Then one would change the reflection indices of one layer, while repeating the process and maintaining control over refractive indices of the other layer. Then one would change the refractive indices of the other layer, while repeating various control refractive indices of the first layer. Clearly, this technique would be virtually impossible to predictably reach a conclusion. Therefore, the prior art has tended to conclude that fingerprint images could not be inhibited.

The prior art notwithstanding, we have unexpectedly discovered the present invention.

This invention can, inter alia, serve to negate the textbook analysis procedures for handling and storage of anti-reflection coated substrates because, in accordance with the structures and methods of the present invention, one need not use gloves in handling AR-coated substrates when attempting to negate fingerprints.

What is claimed is:

1. A fingerprint-resistant two-layer anti-reflection coating for glass substrates consisting essentially of a. an upper thin film layer to be exposed to air, said layer having an index of refraction of from about 1.35 to about 1.46, formed to an optical thickness equal to a quarter wave at a pre-selected design wavelength in the range of about 450 to 550 nanometers; and b. a lower thin film layer to interface the glass substrate, said layer having an index of refraction of from about 1.60 to about 1.72, formed to an optical thickness equal to a half wave at a pre-selected design wavelength in the range of about 450 to 550 nanometers;

whereby the reflectance of light from said fingerprint-resistant two-layer anti-reflection coating when applied to glass substrates is essentially the same in oil and air.

2. The coating of claim 1 wherein the upper layer comprises $MgF_2$.

3. The coating of claim 1 wherein the lower layer comprises $Al_2O_3$.

4. The coating of claim 1 wherein the pre-selected design wavelength is 500 nanometers.

5. The coating of claim 1 wherein the index of refraction for the glass substrate is 1.52 and the index of refraction for the lower layer is 1.6.

6. The coating of claim 1 is characterized by increasing the surface reflectance in oil to a range of 0.5% to 1.5%, while decreasing its reflectance in air to a level of between 0.5% and 1.5%.

7. The coating of claim 1 wherein the index of refraction of the air is 1.0 and the index of refraction of the upper layer is 1.38.

8. The coating of claim 1 wherein the upper layer is $MgF_2$, the lower layer is $Al_2O_3$ and the design wavelength is 500 nanometers.

* * * * *